US006241187B1

(12) United States Patent
Apel et al.

(10) Patent No.: US 6,241,187 B1
(45) **Date of Patent: *Jun. 5, 2001**

(54) ADVERTISING PLACARD

(75) Inventors: William R. Apel, 11701 E. 76th Ter., Raytown, MO (US) 64138; Thomas C. LeTourneau, Parkville, MO (US)

(73) Assignee: William R. Apel, Raytown, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,372

(22) Filed: Sep. 8, 2000

Related U.S. Application Data

(63) Continuation of application No. 09/069,444, filed on Apr. 29, 1998, now Pat. No. 6,126,112.

(51) Int. Cl.[7] ...................................................... B64D 11/00

(52) U.S. Cl. .......................... 244/118.5; 244/1 R; 40/615

(58) Field of Search ................................ 244/1 R, 118.1; 40/615, 630, 611, 584

(56) References Cited

U.S. PATENT DOCUMENTS

| | | | |
|---|---|---|---|
| Re. 34,884 | | 3/1995 | Coleman . |
| 843,235 | * | 5/1907 | Richardson . |
| 3,405,025 | | 10/1968 | Goldman . |
| 4,479,995 | | 10/1984 | Suzuki et al. . |
| 4,804,572 | | 2/1989 | Bodrogi . |
| 4,809,454 | | 3/1989 | Weisman . |
| 5,165,526 | | 11/1992 | Conklin, Jr. . |
| 5,209,340 | | 5/1993 | Munkner et al. . |
| 5,225,260 | | 7/1993 | McNaul et al. . |
| 5,244,080 | | 9/1993 | Bierbaum . |
| 5,246,757 | | 9/1993 | Condon et al. . |
| 5,280,831 | | 1/1994 | Conklin, Jr. . |
| 5,311,980 | | 5/1994 | Munkner et al. . |
| 5,407,711 | | 4/1995 | Lovison et al. . |
| 5,427,227 | | 6/1995 | Crandall et al. . |
| 5,625,969 | * | 5/1997 | Vogler . |
| 5,657,566 | * | 8/1997 | Key . |
| 5,687,929 | | 11/1997 | Hart et al. . |

* cited by examiner

*Primary Examiner*—Charles T. Jordan
*Assistant Examiner*—Tian Dinh
(74) *Attorney, Agent, or Firm*—Kyle L. Elliott; Blackwell Sanders Peper Martin LLP

(57) ABSTRACT

An advertising placard (20) having a substrate (30) and coloration material (34) is utilized to provide an unobtrusive and nondistracting advertisement on internal viewing surfaces (22) in commercial aircraft passenger cabins (24). The substrate (30) is preferably thin and transparent, and the coloration material (34) preferably has substantially the same color hue as the viewing surface (22) to which it is applied. Further, the coloration material (34) preferably has a color lightness within approximately Δ7 of the color lightness of the viewing surface (22).

18 Claims, 3 Drawing Sheets

ADVERTISING PLACARD

This application is a continuation of and claims priority on application Ser. No. 09/069,444, now U.S. Pat. No. 6,126,112, filed Apr. 29, 1998.

BACKGROUND OF THE INVENTION

This invention relates to advertising placards for use in aircraft and, more particularly, to self adhesive advertising placards meeting FAA requirements for use in commercial aircraft passenger cabins.

In the United States alone, millions of people travel on thousands of commercial aircraft every year. These people travel for various reasons including vacations and business. They travel in different classes such as first class, business, and coach, but they all have several things in common. When they board an aircraft, they walk past blank overhead luggage compartments doors. As they ride in aircraft, they look up at blank overhead luggage compartment doors, and while moving around aircraft cabins during flight, they are guided past blank overhead luggage compartment doors. To utilize these literally thousands of blank surfaces, the present invention proposes placing advertising placards on outer surfaces of overhead luggage compartment doors in aircraft passenger cabins.

To protect the prominence of aircraft safety markings and emergency lighting, the Federal Aviation Administration (FAA) requires that items used in commercial aircraft comply with a Conformity Code. To that end, the overhead luggage compartment doors and other internal surfaces of aircraft passenger cabins are typically colored beige, gray, or off-white. These neutral colors serve to highlight safety markings and exit/emergency lighting in aircraft passenger cabins. Thus, any advertising placard must not appreciably distract passenger from the prominence of safety markings and emergency lighting before the FAA will approve it for use in aircraft passenger cabins.

Advertising placards placed in passenger aircraft cabins should also be unobtrusive because the passengers will view them, in many cases, for several hours depending on the length of the flight. An obtrusive advertising placard could overwhelm and have an undesirable impact on the passengers. Further, because there are thousands of overhead luggage compartment doors in operation, advertising placards used on these doors should be relatively easy to put in place, and because specific advertisers frequently change, advertising placards should be relatively easy to remove without damaging the doors.

Additional FAA requirements and tests must also be passed before an advertising placard may be used in aircraft passenger cabins. In the vertical burn test of 14 C.F.R. § 25.853, Appendix F(b)(4) for example, an advertising placard is applied to an overhead luggage compartment door, or to another specific component to which the placard is to be applied, and the door and placard are exposed to fire. Specifically, the door and placard are orientated vertically ¾ inch above a burner with a 1½ inch flame. The flame is maintained for sixty seconds. Once the flame is removed, the sample must not continue burning for more than fifteen seconds, and the burn length must not exceed six inches on average. The test is performed on a minimum of three samples.

Thus, placing advertising placards on the thousands of overhead luggage compartment doors is desirable to reach millions of people with advertisements. It is also desirable to provide an unobtrusive advertising placard to obtain FAA approval and avoid overwhelming passengers. It is further desirable to provide an advertising placard that is relatively easy to put in place and remove without damaging the surface to which it is applied.

BRIEF SUMMARY OF THE INVENTION

There is, therefore, provided in the practice of the invention a novel advertising placard for application to an internal viewing surface in a commercial passenger aircraft cabin. The placard includes a substrate and a coloration material associated with the substrate for forming a desired advertising pattern.

In a preferred embodiment, the coloration material has a coloration material color appearance within approximately 40% of the color appearance of the viewing surface. In one embodiment, the coloration material color appearance is 40% darker, and in another embodiment, the coloration material color appearance is 40% lighter. Preferably, the coloration material has substantially the same hue as the viewing surface and has a gloss level in the range of approximately 10 to approximately 20 for a glossmeter set at a single geometry of 85°.

Both the substrate and the coloration material are thin and flexible, so that when the substrate is covered by the coloration material, the placard appears to be integral to the viewing surface. Further, both the substrate and coloration material are preferably unobtrusive and flame retardant to comply with FAA regulations and requirements. The substrate is preferably self adhesive to reduce the time required for application to the viewing surface.

There is further provided in the practice of the invention a novel overhead luggage compartment door for use in commercial aircraft passenger cabins. The luggage compartment door includes a background color appearance and an advertising pattern having an advertising pattern color appearance in contrast to the background color appearance.

There is still further provided in the practice of the invention a novel method for applying an advertising placard to an internal viewing surface in a commercial aircraft passenger cabin. The method comprises preparing an advertising placard with a coloration material color appearance in contrast to a color appearance of the viewing surface and applying the placard to the internal viewing surface.

In a preferred embodiment, applying the placard to the viewing surface comprises heating the viewing surface, adhering the placard to the viewing surface, and conforming the placard to a surface texture of the internal viewing surface. Additionally, conforming the placard to the surface texture includes squeegeeing the placard to the viewing surface and brushing the placard to the viewing surface. It is also preferred that the edges of the placard are lightly heated to seal the edges against the viewing surface.

Accordingly, it is an object of the present invention to provide an improved advertising placard for use in commercial aircraft passenger cabins.

It is a further object of the present invention to provide an improved method for applying advertising placards to viewing surfaces in commercial aircraft passenger cabins.

BRIEF DESCRIPTION OF THE DRAWINGS

These and other inventive features, advantages, and objects will appear from the following Detailed Description of The Preferred Embodiments when considered in connection with the accompanying drawings in which similar reference characters denote similar elements throughout the several views and wherein.

DETAILED DESCRIPTION OF THE PREFERRED EMBODIMENTS

Figure 1:
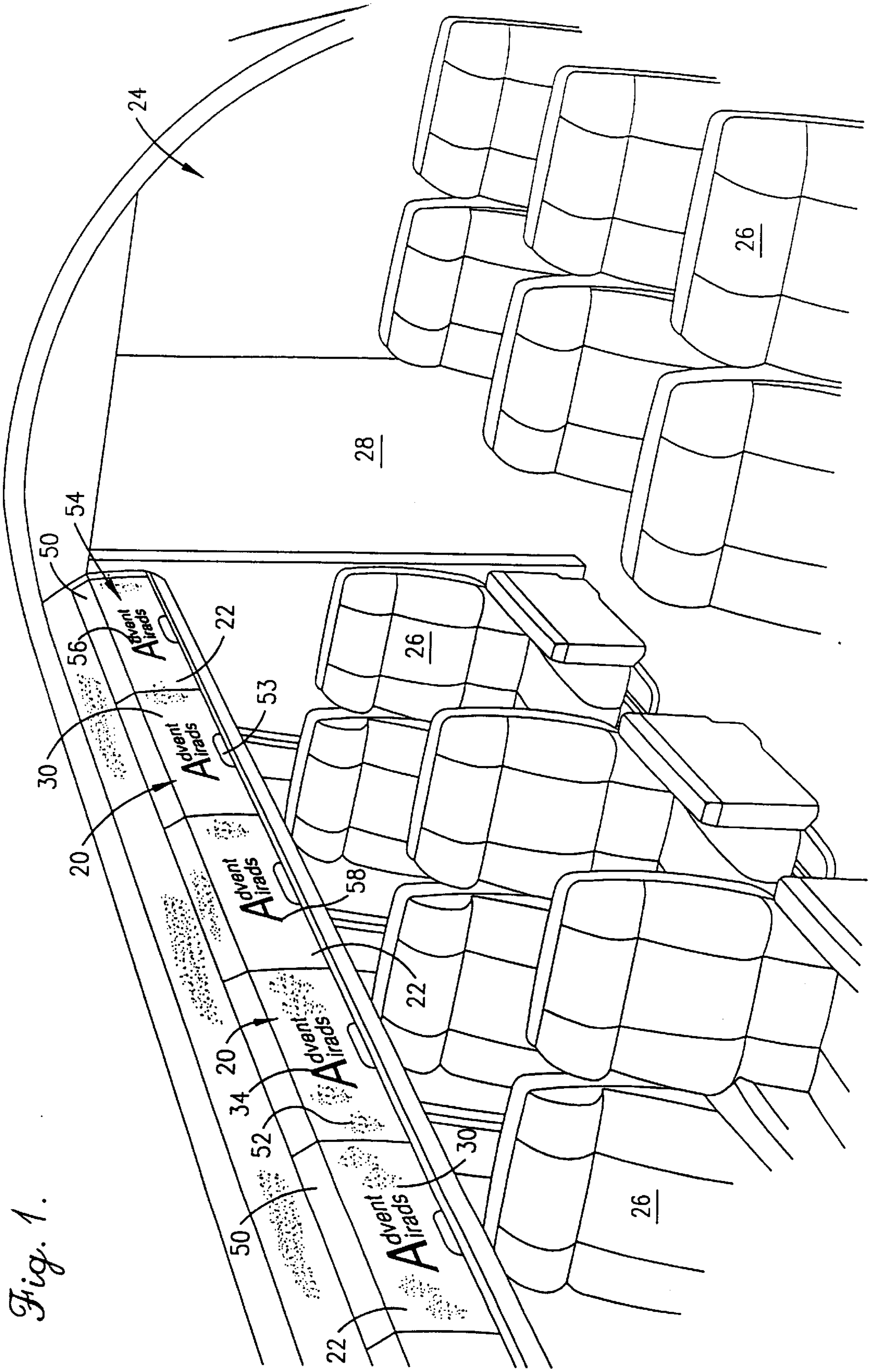
FIG. 1 is a schematic perspective view of a commercial aircraft passenger cabin having advertising placards according to the present invention applied to the overhead luggage compartment doors of the cabin.

Referring to the drawings in greater detail, FIG. 1 shows a plurality of advertising placards 20 mounted on viewing surfaces 22 in a commercial aircraft passenger cabin 24. Every time passengers look up or get out of their seats 26 to move up and down the isle 28, they are guided past the advertising placards 20. Therefore, the passengers are continuously exposed to the advertisement for the duration of the flight.

Figure 2:
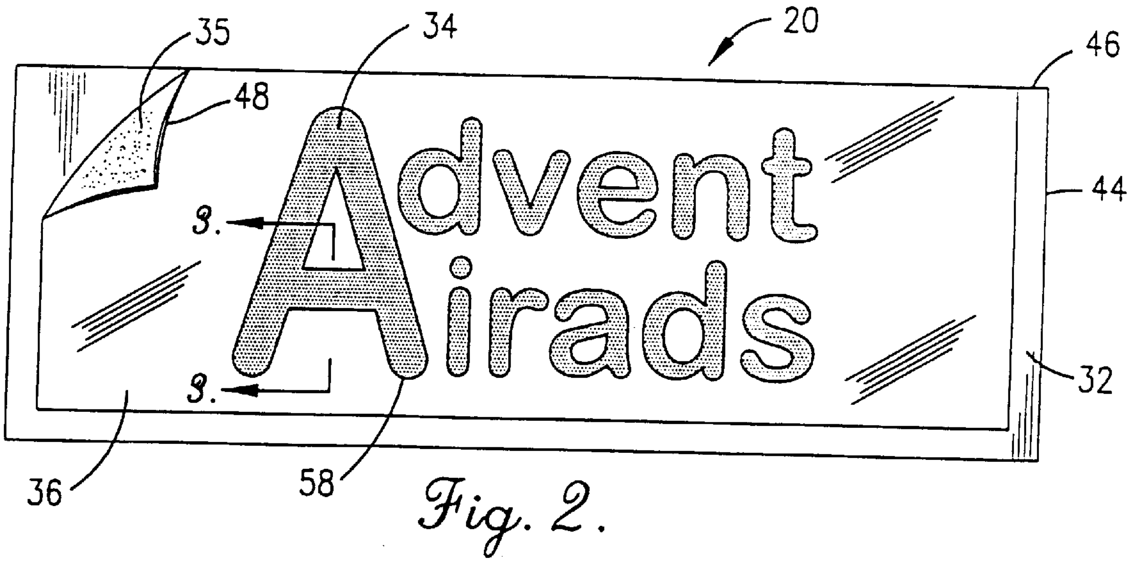
FIG. 2 is a front view of an advertising placard according to the present invention with a face alignment sheet applied thereto for installation.
Figure 3:
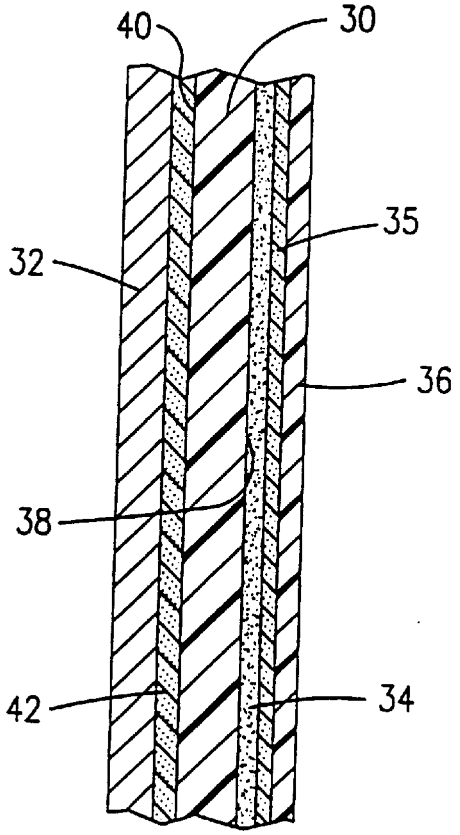
FIG. 3 is a cross sectional view of the advertising placard of FIG. 2 taken along line 3—3.

Referring to FIGS. 2 and 3, each advertising placard 20 includes a substrate 30 and a coloration material 34 arranged in a desired advertising pattern. Prior to installation, the substrate has a backing sheet 32, and a face alignment sheet 36 is attached to the placard 20 opposite the backing sheet 32. The face alignment sheet 36 is removably adhered to the coloration material with an adhesive layer 35. The placard is substantially flat with a configuration matching the advertisement whether it be a design or words such as the illustrated trademark Advent Airads™.

The substrate 30 is preferably thin and flat, and it has as many pieces as are necessary to make up the discrete parts of the advertisement. The substrate has an outer side 38 opposite the viewing surface and an inner side 40 facing the viewing surface 22. The backing sheet 32 covers the inner side 40, and the face alignment sheet 36 covers the outer side 38. The substrate is preferably transparent with a thickness in the range of approximately 1 mil to approximately 3 mils with a preferred thickness of approximately 2 mils, and the substrate is also preferably nonglossy and flexible; so that it is not readily perceivable when applied to the viewing surface 22.

The outer and inner sides 38, 40 are preferably smooth with the inner side being adapted to attach to the viewing surface 22. The inner side preferably comprises a self adhesive inner side, so that the substrate is self adhering to the viewing surface. To that end, an adhesive layer 42 is applied to the inner side 40, so that it can be readily adhered to the viewing surface 22.

A preferred substrate is a colorless and clear vinyl substrate produced by Avery Dennison which can be obtained by contacting Avery at 250 Chester Street, Painsville, Ohio 44077 or telephone number 1-800-321-6530 and requesting XL™ 1000 series S-652/78B clear cast vinyl film 2.1 mils thick. As required by the above referenced FAA regulations, the substrate is also preferably flame retardant. Tests conducted with the vinyl substrate applied to the viewing surface at the direction of the inventor have successfully passed the flame retardant requirements. Though the substrate is preferably colorless to obtain a visually unobtrusive placard, the substrates can be colored as desired. Preferably, the color of the substrate would approximate the color of the viewing surface 22.

The backing sheet 32 has an outer perimeter 44 configured to surround all of the discrete pieces of the substrate. For ease of application to the viewing surface as described below, it is preferred that at least one edge, preferably a top edge 46, of the backing sheet 32 substantially coincide with an edge, preferably a top edge 48, of the face alignment sheet 36. The backing sheet is removably adhered to the inner side 40 of the substrate to protect the adhesive 42 prior to adhering the placard 20 to the viewing surface 22. Thus, it is desirable that the backing sheet cover the entire inner side of all of the discrete pieces of the substrate.

The coloration material 34 is preferably a UV cured ink, screen printed on at least one of the outer and inner surfaces 38, 40 of the substrate 30. The coloration material preferably has a thickness in the range of approximately ¼ mils to approximately 1 mils. Though screen printing is preferred, other printing processes such as flexographic, offset, gravure, or lithographic, for example, can be used. Additionally, the substrate can be formulated to integrally include the coloration material 34. However, screen printing has proven advantageous in associating the coloration material with the substrate. The inks used in screen printing are comparatively inexpensive, easy to formulate to achieve proper color match and gloss values, and are compatible with preferred substrates. Additionally, screen printing inks adhere well to preferred substrates, and are resistant to fading, abrasion, and cleaning solutions. The screen printing inks also have the desired flexibility to conform to the viewing surface texture and the desired flame retardant capabilities to satisfy FAA regulations.

To obtain a visually unobtrusive placard and comply with FAA requirements, the ink preferably has the substantially same color hue and color chroma as the viewing surface 22 with a tolerance of approximately 86 for color hue and approximately Δ4 for color chroma. More specifically, the coloration material color hue and color chroma of the ink are preferably within approximately Δ3 of the color hue and approximately Δ2 of the color chroma of the viewing surface as determined by a calorimeter using the CIELCH standard.

The common internal viewing surfaces of commercial aircraft passenger cabins have a color hue of approximately 87° (87.73°) and color chroma of approximately 7 (6.88) for beige, a color hue of approximately 79° (79.43°) and color chroma of approximately 4 (4.17) for grey, and a color hue of approximately 60° (59.98°) and color chroma of approximately 4 (4.07) for off-white.

The color lightness of the ink is adjusted to contrast the ink with the viewing surface in an unobtrusive manner that does not annoy passengers or distract from safety insignia and emergency lighting. The color lightness of the ink is within approximately Δ7, on a scale of 0–100, of the color lightness of the viewing surface 22 as measured with a calorimeter. Preferably, the color lightness of the ink is within approximately Δ3 of the color lightness of the viewing surface 22.

In contrasting the ink with the viewing surface, the color lightness of the ink is adjusted, so that the ink's color appearance is either darker or lighter than the color appearance of the viewing surface. If, for example, the color lightness of the beige viewing surface is approximately 91 (91.36) the darker ink would have a color lightness value in the range of approximately 84 (84.36) to approximately 90 (90.36). The lighter ink would have a color lightness value in a range of approximately 92 (92.36) to approximately 98 (98.36). Preferably, the ink has at least one unit greater or less than the color lightness of the viewing surface. The ranges for grey with a color lightness of approximately 89 (89.18) are from approximately 82 (82.18) to approximately 88 (88.18) for darker and from approximately 90 (90.18) to approximately 96 (96.18) for lighter. The ranges for off-white with a color lightness of approximately 92 (92.53) are approximately 85 (85.53) to approximately 91 (91.53) for darker and from approximately 93 (93.53) to approximately 99 (99.53) for lighter realizing that color saturation points may be reached before these lightness values.

Figure 4:
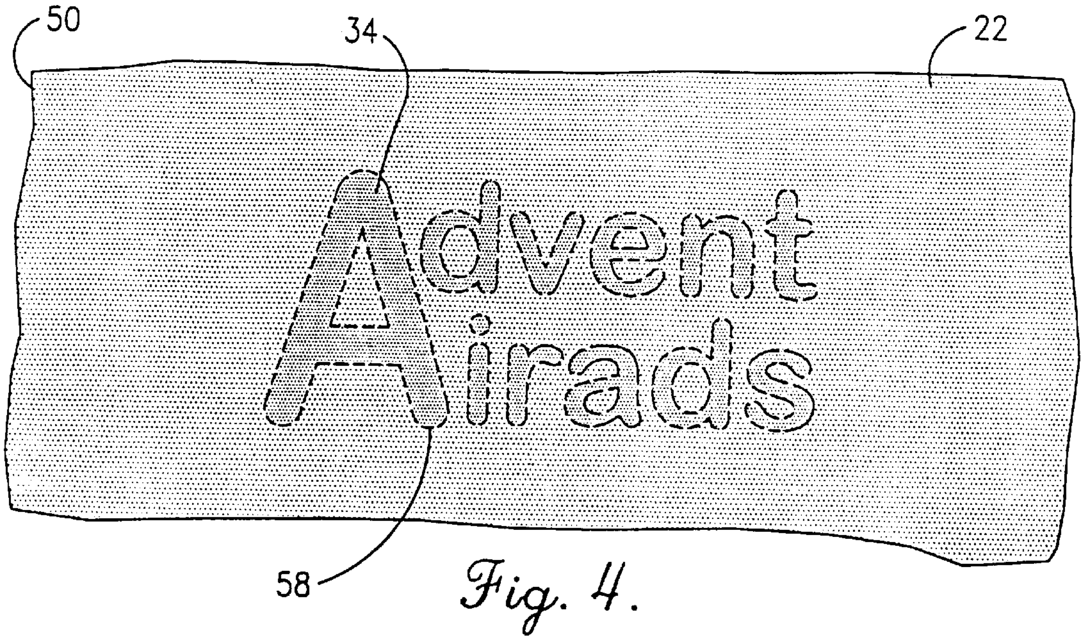
FIG. 4 is a fragmentary front view of an overhead luggage compartment door having the advertising placard of FIG. 2 applied thereto.

To obtain the desired variations in color appearance, the coloration material, preferably ink, having a coloration material hue and chroma approximately the same as the viewing surface hue and chroma is mixed with a lightness manipulation element, which is preferably black ink, to darken the coloration material ink. The coloration material ink is mixed with increasing amounts of black ink until the color of the ink appears preferably 40% darker than the color of the viewing surface as illustrated in FIG. 4. Additional black ink can be added until the inks color appears approximately 60% darker than the color of the viewing surface.

Figure 5:
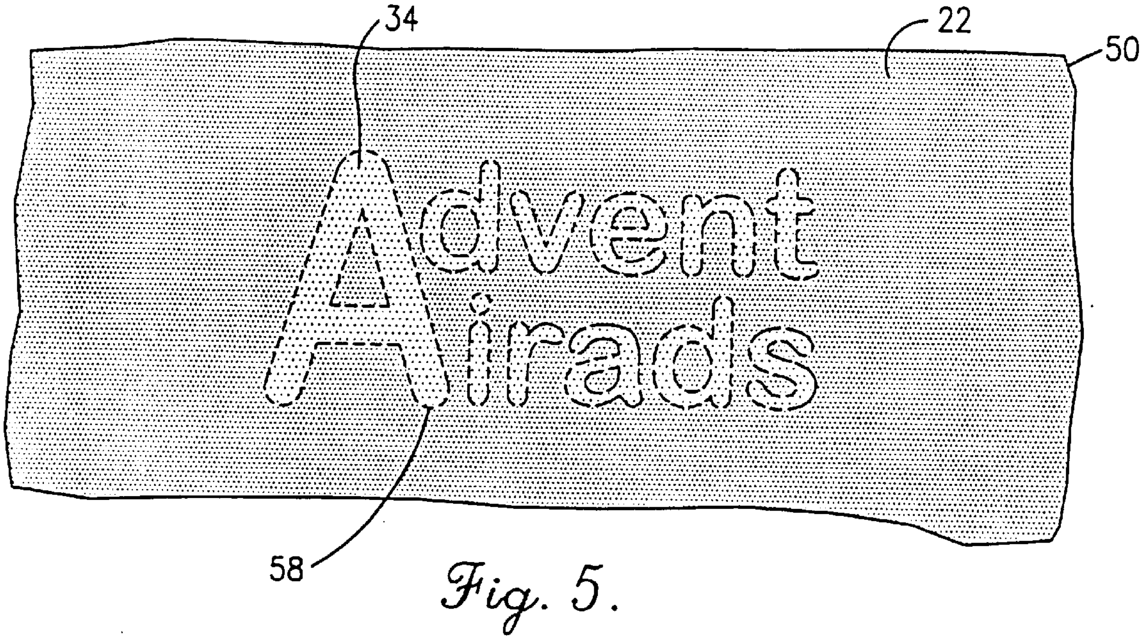
FIG. 5 is a fragmentary front view of an overhead luggage compartment door having an alternate embodiment of an advertising placard according to the present invention applied thereto.

To lighten the ink, as illustrated in FIG. 5, a lightness manipulation element, preferably white ink, is added until the color of the ink appears approximately 40% lighter than the color of the viewing surface. Additionally, white ink can be added until the ink appears approximately 60% lighter than the viewing surface. The extremes of the ranges may be limited by color saturation points. The ink is preferably somewhat translucent allowing the viewing surface to show through the ink in small amounts, so that the color appearance of the viewing surface combines with the color hue, chroma, and lightness of the advertising pattern after the placard is applied to the viewing surface.

The gloss level of the ink is preferably maintained in the range of approximately 5 to approximately 25 for a gloss-meter set at a single geometry of approximately 85°. More narrowly, the gloss level is maintained in a range of approximately 10 to approximately 20. This range provides a generally flat ink which is unobtrusive and does not distract from safety information found inside the aircraft passenger cabin and is not unduly reflective of emergency lighting. Because UV cured inks in their original formulation are glossy, a flattening compound is added to achieve the desired gloss levels. In one embodiment, the ink contains approximately seventy parts of the color and approximately thirty parts of the flattening compound.

In a preferred embodiment, as shown in FIG. 1, the viewing surface comprises an overhead luggage compartment door 50 commonly called a stow door. In alternate embodiments, the viewing surfaces can comprise, for example, seat back trays, seat backs, cabin walls, or cabin ceilings. The viewing surface 22 of the stow door is typically textured with granulations 52, although it can be smooth, and includes an opening/latching mechanism 53 for opening the door and holding the door closed. Further, the doors are fabricated with a flame retardant material which meets the requirements of the above referenced FAA regulations.

In an alternate embodiment, also shown in FIG. 1, an alternate advertising placard 54 is provided having a coloration material 56 integral to the stow door. The contrasting coloration material 56 again forms an advertising pattern having an advertising pattern color lightness in contrast to the background color lightness of the stow door 50. The contrasting coloration features of the advertising placard 20 discussed above, are utilized in conjunction with this embodiment and will not be repeated here for the sake of brevity.

The advertising placards are fabricated by screen printing and UV curing the coloration material onto a substantially rectangular substrate. The substrate is die cut with a computer plotter, kiss-cut die, or thermal die cut around each edge of the coloration material including both external and internal edges. The portions of the substrate without coloration material are removed from the backing sheet, and the face alignment sheet 36 is applied over the top of the backing sheet and the remaining discrete pieces of the placard. The preferred maximum dimensions of the extremities of the placard are approximately 7 inches in height by approximately 20 inches in length. Further, the placard covers no more than approximately 40% of the viewing surface 22, so that the placard is unobtrusive. Preferably, the placard covers less than approximately 25% of the viewing surface.

In application of the advertising placard 20 to the viewing surface 22, the viewing surface is cleaned and wiped dry with a lint free cleaning towel. Preferably, the viewing surface is lightly preheated with a portable propane torch or electric heat gun. The desired location of the placard being determined with a conventional measuring device or a positioning template, the top edges 46, 48 of the backing sheet 32 and face alignment sheet 36 respectively are secured in position to the viewing surface with a temporary, removable fastener, such as masking tape, to hingably attach the placard to the viewing surface. The placard is then raised away from the viewing surface about the hinged connection, and the backing sheet removed, with the face alignment sheet holding the discrete parts of the placard in relative position. Then the placard 20 is squeegeed to the viewing surface, so that the substrate 30 and the coloration material 34 substantially conform to the granulated surface texture of the viewing surface 22.

To further conform the substrate and the coloration material to the texture of the viewing surface, the placard is brushed against the viewing surface. This also seals the substrate against the viewing surface. The face alignment sheet and masking tape are then removed by pulling the face alignment sheet off of the viewing surface and substrate at an angle of 180°. Thus, it is necessary that the substrate adhesive layer 42 is a stronger adhesive than the face alignment sheet adhesive layer 35. If needed, light heat is applied to the placard, preferably about its edges, to prevent the edges from peeling away from the viewing surface. The adhesive is then allowed to cure.

To remove the advertising placard 20, heat is preferably applied to the placard, and a sharp instrument is used to separate an edge 58 of the placard from the viewing surface 22. The substrate 30 can then be peeled away from the viewing surface. If adhesive residue is left on the viewing surface it can be removed with a conventional cleaner.

The advertising placard 20 according to the present invention, provides an unobtrusive and nondistracting means to display advertisements in association with the internal viewing surfaces of commercial aircraft passenger cabins while complying with FAA requirements. Because the substrate is transparent, colorless, thin, and flexible, it is nearly invisible to the casual observer with even the edges being indiscernible. Further, because the coloration material 34 has substantially the same color hue as the viewing surface and is flexible, the coloration material appears to be an integral part of the viewing surface.

Thus, an advertising placard is disclosed which utilizes a transparent substrate with ink printed thereon to unobtrusively display an advertising design inside a commercial aircraft passenger cabin. While preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. An advertising placard for application to an internal viewing surface in a commercial aircraft passenger cabin, the viewing surface having a color appearance, a color hue, and a surface texture, and the placard comprising:

a substrate having a thickness; and a coloration material associated with the substrate to form a desired advertising pattern, the coloration material including a coloration material hue substantially the same as the color hue of the viewing surface and a lightness manipulation element in an amount so that a coloration material color appearance is within approximately 40% of the color appearance of the viewing surface.

2. The placard according to claim 1 wherein the coloration material color appearance is approximately 40% darker than the color appearance of the viewing surface whereby the coloration material appears darker than the viewing surface.

3. The placard according to claim 1 wherein the coloration material color appearance is approximately 40% lighter than the color appearance of the viewing surface whereby the coloration material appears lighter than the viewing surface.

4. The placard according to claim 1 wherein the coloration material is translucent, and the color appearance of the viewing surface combines with the coloration material color appearance.

5. The placard according to claim 1 wherein the coloration material comprises a gloss level in the range of approximately 10 to approximately 20 for a glossmeter set at a single geometry of approximately 85°.

6. The placard according to claim 1 wherein the coloration material comprises a flexible coloration material for conforming to the surface texture when the placard is applied to the viewing surface, and the surface texture comprises a granulated surface texture.

7. The placard according to claim 1 wherein the coloration material comprises a UV curable ink, a flattening compound, and a lightness manipulating element, and the substrate comprises a vinyl substrate.

8. The placard according to claim 1 wherein the substrate comprises a substantially transparent substrate, and the thickness is in the range of approximately 1 mil to approximately 3 mils whereby the substrate is substantially indiscernible to the casual observer.

9. The placard according to claim 1 wherein the substrate comprises a flexible substrate for conforming to the surface texture when the placard is applied to the viewing surface whereby the substrate is substantially indiscernible to the casual observer.

10. The placard according to claim 1 further comprising a removable backing, and wherein the substrate comprises a self adhesive substrate having an adhesive side covered by the backing prior to application on the viewing surface.

11. The placard according to claim 1 wherein the substrate comprises an adhesive side, and an outer side opposite the adhesive side; and the coloration material comprises ink screen printed on the outer side of the substrate.

12. The placard according to claim 1 wherein the coloration material comprises a flame retardant coloration material.

13. An advertising placard in combination with an internal viewing surface in a commercial passenger aircraft cabin, the viewing surface including: a flame retardant material, a color appearance, a color hue, and a surface texture, and the placard comprising:

a substrate attached to the viewing surface, and the substrate having a thickness; and a coloration material associated with the substrate forming a desired advertising pattern, and the coloration material including a coloration material color appearance in contrast to the color appearance of the viewing surface, and a lightness manipulation element in an amount so that the color appearance appears within approximately 60% of the color appearance of the viewing surface.

14. The combination according to claim 13 further comprising an adhesive attaching the substrate to the viewing surface.

15. The combination according to claim 13 wherein the internal viewing surface comprises an overhead luggage compartment door.

16. The combination according to claim 13 wherein the coloration material comprises a gloss level in the range of approximately 5 to approximately 25 for a glossmeter set at a single geometry of approximately 85°, and the coloration material color hue is substantially the same as the color hue of the viewing surface.

17. The combination according to claim 13 wherein the coloration material comprises a coloration material color lightness, the viewing surface comprises a viewing surface color lightness, and the coloration material color lightness is different than the viewing surface color lightness to contrast the viewing surface color appearance with the coloration material color appearance.

18. The combination according to claim 17 wherein the coloration material color lightness is approximately $\Delta 3$ different from the viewing surface color lightness.

* * * * *